(12) United States Patent
Ross et al.

(10) Patent No.: US 7,971,607 B2
(45) Date of Patent: Jul. 5, 2011

(54) ELECTROMAGNETIC HYDRAULIC VALVE

(75) Inventors: Christoph Ross, Bamberg (DE);
Herbert Stoeckel, Grafenberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 859 days.

(21) Appl. No.: 11/993,882

(22) PCT Filed: Jul. 8, 2006

(86) PCT No.: PCT/EP2006/006703
§ 371 (c)(1),
(2), (4) Date: Dec. 26, 2007

(87) PCT Pub. No.: WO2007/025600
PCT Pub. Date: Mar. 8, 2007

(65) Prior Publication Data
US 2008/0196777 A1    Aug. 21, 2008

(30) Foreign Application Priority Data

Jul. 27, 2005  (DE) .......................... 10 2005 034 938

(51) Int. Cl.
*F15B 13/044* (2006.01)
*B01D 35/06* (2006.01)
*B01D 35/04* (2006.01)
*B03C 1/30* (2006.01)

(52) U.S. Cl. ................... 137/625.65; 137/544; 137/546; 210/222; 123/90.12

(58) Field of Classification Search ................. 137/544, 137/546, 625.65; 210/167.03, 167.29, 222, 210/695; 123/90.12

See application file for complete search history.

(56) References Cited

U.S. PATENT DOCUMENTS

| | | | | |
|---|---|---|---|---|
| 2,937,710 | A | * | 5/1960 | Michael et al. ............... 210/222 |
| 4,979,542 | A | * | 12/1990 | Mesenich ............... 137/625.65 |
| 5,056,556 | A | | 10/1991 | Nishimoto et al. |
| 2003/0159453 | A1 | | 8/2003 | Ott et al. |
| 2003/0159454 | A1 | | 8/2003 | Ott et al. |
| 2003/0160672 | A1 | | 8/2003 | Ott et al. |
| 2005/0189510 | A1 | * | 9/2005 | Golovatai-Schmidt et al. ...................... 251/129.15 |
| 2007/0017587 | A1 | * | 1/2007 | Groschel et al. ......... 137/625.65 |
| 2007/0131601 | A1 | * | 6/2007 | Najmolhoda et al. ........ 210/222 |

FOREIGN PATENT DOCUMENTS

| | | |
|---|---|---|
| DE | 3309904 | 9/1984 |
| DE | 4305987 | 11/1993 |
| DE | 10195791 | 8/2004 |
| EP | 1544525 | 11/2004 |

* cited by examiner

*Primary Examiner* — John Rivell
(74) *Attorney, Agent, or Firm* — Volpe and Koenig, P.C.

(57) ABSTRACT

An electromagnetic hydraulic valve (1) is provided having a magnetic armature (8) which is guided in a longitudinally movable fashion in an armature guide (9) and activates a valve push rod (15) which extends in a valve housing (14). The valve push rod (15) controls the connection between connection openings (28, 29, 30), formed in the valve housing (14), for hydraulic medium in that the valve push rod (15) is operatively connected to one or more sealing bodies (22, 23) which correspond to one or more sealing sleeves (17, 18) supported in the valve housing (14). The hydraulic valve (1) includes an arrangement for precipitating particles of dirt, which element includes an intermediate floor (31), which is arranged between the armature guide (9) and the connection openings (28, 29, 30). The intermediate floor (31) forms a hydraulic seal with an inner casing surface (16) of the valve housing (14), and the valve housing (14) is formed of a magnetizable material in order to precipitate ferromagnetic particles of dirt.

10 Claims, 2 Drawing Sheets

ELECTROMAGNETIC HYDRAULIC VALVE

BACKGROUND

The invention relates to an electromagnetic hydraulic valve with a magnetic armature, which is guided in an armature guide so that it can move longitudinally and which actuates a valve push rod running in a valve housing. This valve push rod controls the connection between connection openings constructed in the valve housing for hydraulic medium by placing the valve push rod in active connection with one or more sealing bodies that correspond to one or more sealing sleeves supported on the valve housing, wherein the hydraulic valve has means for separating sediment particles.

Hydraulic valves, which have means for separating sediment particles from the hydraulic medium for guaranteeing continuous functionality of the hydraulic valves themselves or components running downstream, are known in the state of the art. These sediment particles are led into the hydraulic valve as suspended particles in the hydraulic medium and originate, on one hand, from so-called residual sediment, which accumulates during production, for example, of an internal combustion engine, predominantly in the form of metallic particles and which can also not be completely removed through complicated cleaning measures. On the other hand, these sediment particles are produced through continuous rubbing of moving components during the operation of the internal combustion engine. Thus, the functionality, in particular, of horizontally installed hydraulic valves, can be endangered due to the excessive penetration of sediment particles between the magnetic armature and its armature guide. The resulting tightness of the magnetic armature as a rule leads to a considerable negative effect on the switching dynamics of the hydraulic valve and manifests itself in a reduced and/or greatly fluctuating gradient of the hydraulic medium pressure. In the extreme case, sediment particles led into the armature guide cause a complete failure of the hydraulic valve due to a locking magnetic armature.

For example, in DE 196 31 631 A1, which is considered to be a class-defining patent, an electromagnetic hydraulic valve is provided, whose pressure connection features a sieve filter for the inlet-side separation of sediment particles. This method, however, is associated with a few disadvantages, which are explained below.

First, it is not taken into account that sediment residue in the hydraulic valve itself due to production, as well as sediment particles produced by the operating interaction between moving components in the hydraulic valve, could lead to a negative effect on the function of the hydraulic valve as well as components running downstream through their target service life.

Furthermore, the filtration efficiency of the sieve filter is dependent on its mesh width or the size of the passage openings. In this respect, the penetration of external sediment particles into the hydraulic valve is merely limited but not completely prevented. This limitation is especially disadvantageous for hydraulic valve constructions, in which the hydraulic valve carries a flow of hydraulic medium coming from several connection lines. For example, in a 3/2 directional control valve, for achieving the (limited) effect, it would be necessary to provide at least both the pressure connection P and also the work connection A with a filter element, because in a second switch position of such a hydraulic valve, the hydraulic medium would flow out of the work line A coming in the direction of the tank connection T. The installation of a second filter element, however, is associated with correspondingly high and cost-intensive structural expense.

In addition, for retaining very small particles, a fine or very fine filter has to be provided, which generates, however, an undesirably high pressure loss in the hydraulic medium at the inlet and, in the case of the previously mentioned 3/2 directional control valve with two filter elements, also at the outlet from the hydraulic valve. This pressure loss also increases with the loading of the filter with sediment particles over the course of time.

SUMMARY

Therefore, the invention is based on the objective of avoiding these mentioned disadvantages and creating an electromagnetic hydraulic valve of the type noted above, whose means for separating the sediment particles continuously guarantee the functionality of the hydraulic valve. In this way, in particular, the armature guide is largely protected from penetrating sediment particles, in order to effectively prevent temporary or permanent locking of the magnetic armature in the armature guide. The hydraulic valve should also be able to be produced as cost-effectively as possible.

According to the invention, the objective is met by the characterizing features of Claims 1 and 10, while advantageous improvements and constructions are to be taken from the subordinate claims.

According to the characterizing portion of Claim 1, the means for separating sediment particles comprise an intermediate floor, which is arranged between the armature guide and the connection openings and which forms a tight seal hydraulically with an inner casing surface of the valve housing. Here, for the purpose of separating ferromagnetic sediment particles, the valve housing is made from a magnetizable material. The functionality of the hydraulic valve constructed in this way is continuously guaranteed in that the hydraulic valve carries a flow of hydraulic medium primarily in the region of the connection openings, while the magnetic armature and its armature guide is shielded by the intermediate floor. Thus, sediment particles, which are led into the interior of the hydraulic valve via the connection openings—and as far as they are not transported out of the valve with the flow of hydraulic medium—are kept away from the magnetic armature and its guide by the shielding effect of the intermediate floor. Because the valve housing can be magnetized and is also simultaneously magnetized by the effect of the energized electromagnet during the operation of the hydraulic valve, the predominantly ferromagnetic sediment particles settle on the side of the intermediate floor facing away from the magnetic armature on the inner casing surface of the valve housing. Further transport of the deposited sediment particles in the direction of the magnetic armature is then prevented, in particular, also for a horizontally installed hydraulic valve, in that the intermediate floor forms a tight seal hydraulically with the inner casing surface of the valve housing.

An especially effective separation of the ferromagnetic sediment particles at the magnetized valve housing while simultaneously keeping particles out of the direct environment of the valve push rod can be achieved especially effectively in that the intermediate floor is produced as an individual part and is made from a non-magnetizable material. The hydraulically tight connection of this individual part to the valve housing can be made using known methods with a positive, non-positive, or material fit, as well as with combinations of these types of fits. In addition to plastic, preferably, an austenitic, corrosion-resistant steel, such as, for example, X5CrNi1810, should be provided as the non-magnetizable material of the intermediate floor constructed in this manner.

The intermediate floor produced as an individual part can be constructed, furthermore, as a thin-walled and cup-shaped annular sleeve with a cylindrical outer casing surface and a floor, which surrounds the valve push rod with an opening that is concentric to the outer casing surface. In this way, the annular sleeve is pressed over the outer casing surface into the inner casing surface of the valve housing, so that the open side of the annular sleeve is turned toward the magnetic armature. Advantages to this construction of the intermediate floor are that the annular sleeve is produced especially cost-effectively and is easily mounted in the valve housing. Another aspect of the invention provides that the floor of the annular sleeve is shaped like a cone, such that an annular space for separated sediment particles is formed between an outer side of the floor facing away from the magnetic armature and the inner casing surface of the valve housing. The annular sleeve constructed in this way thus develops a virtually optimum storage effect, because the low flow rates in the annular space promote the deposited sediment particles remaining in this location.

In another refinement of the invention, the hydraulic valve is constructed as a 3/2 directional control valve, with the connection openings being used as the pressure connection P, the work connection A, and the tank connection T. In particular, the 3/2 directional control valve can be produced in both a functionally reliable and also cost-effective way, such that the valve push rod is produced as a molded body made from plastic and has projecting rails, with which it is guided in the valve housing on the side of the intermediate housing facing the magnetic armature. Here, the sealing bodies of the valve push rod should run on the side of the intermediate floor facing away from the magnetic armature and should have a conical shape and facing sealing surfaces, which interact alternately with valve seats shaped on the cup-shaped sealing sleeves pressed into the valve housing.

Furthermore, between the valve push rod and the intermediate floor, at least one overflow cross section should remain in the direction of the magnetic armature. Such an overflow cross section is used, on one hand, for equalizing the volume and pressure within the hydraulic valve during reciprocating movements of the magnetic armature and the valve push rod. On the other hand, due to the excess of hydraulic medium, sufficient lubrication of the magnetic armature moving longitudinally in the armature guide is guaranteed. Indeed, during an overflow process of the hydraulic medium, transport of sediment particles in the direction of the magnetic armature is not excluded, but due to the previously described shielding effect of the intermediate floor, it involves, at most, only a negligibly small quantity of sediment particles, whose ferromagnetic portion was also deposited predominantly on the magnetized inner casing surface of the valve housing on each side of the intermediate floor.

The hydraulic valve should be used preferably for controlling hydraulically displaceable actuators of a variable valve drive of an internal combustion engine. Such actuators are known to those skilled in the art in the field of variable valve trains, among other things, as hydraulically actuated coupling systems, such as those used, for example, in camshaft adjusters, variably switchable cams of a camshaft or for switching or turning off gas-exchange valves in switchable cam followers in the form of switchable tappets, levers, or support elements. The hydraulic control of such coupling elements involves the highest possible, minimally fluctuating, and reproducible gradient of the hydraulic medium pressure in the work line when switching between the two positions of the hydraulic valve. This is required in the case of the switchable cams or the switchable cam followers in that the switching process of the coupling element(s) must always be successfully completed in the only very short time of a cam base circle phase for all of the involved cam followers.

A solution tailored to the problem is also given by the features noted in the characterizing part of Claim 10. These have been explained above and concern, in combination, an especially preferred construction of the hydraulic valve according to the invention, whose risk of locking of the magnetic armature due to the sediment particles penetrating into the armature guide is at least significantly reduced with simple means. In addition, a high, minimally fluctuating and continuously reproducible gradient of the hydraulic medium pressure is guaranteed by the continuously uniform and low-friction longitudinal guide of the magnetic armature in its armature guide, as well as the valve push rod.

BRIEF DESCRIPTION OF THE DRAWINGS

In the enclosed drawings, the electromagnetic hydraulic valve according to the invention is shown using the example of a 3/2 directional control valve. Shown are.

DETAILED DESCRIPTION OF THE PREFERRED EMBODIMENTS

Figure 1:
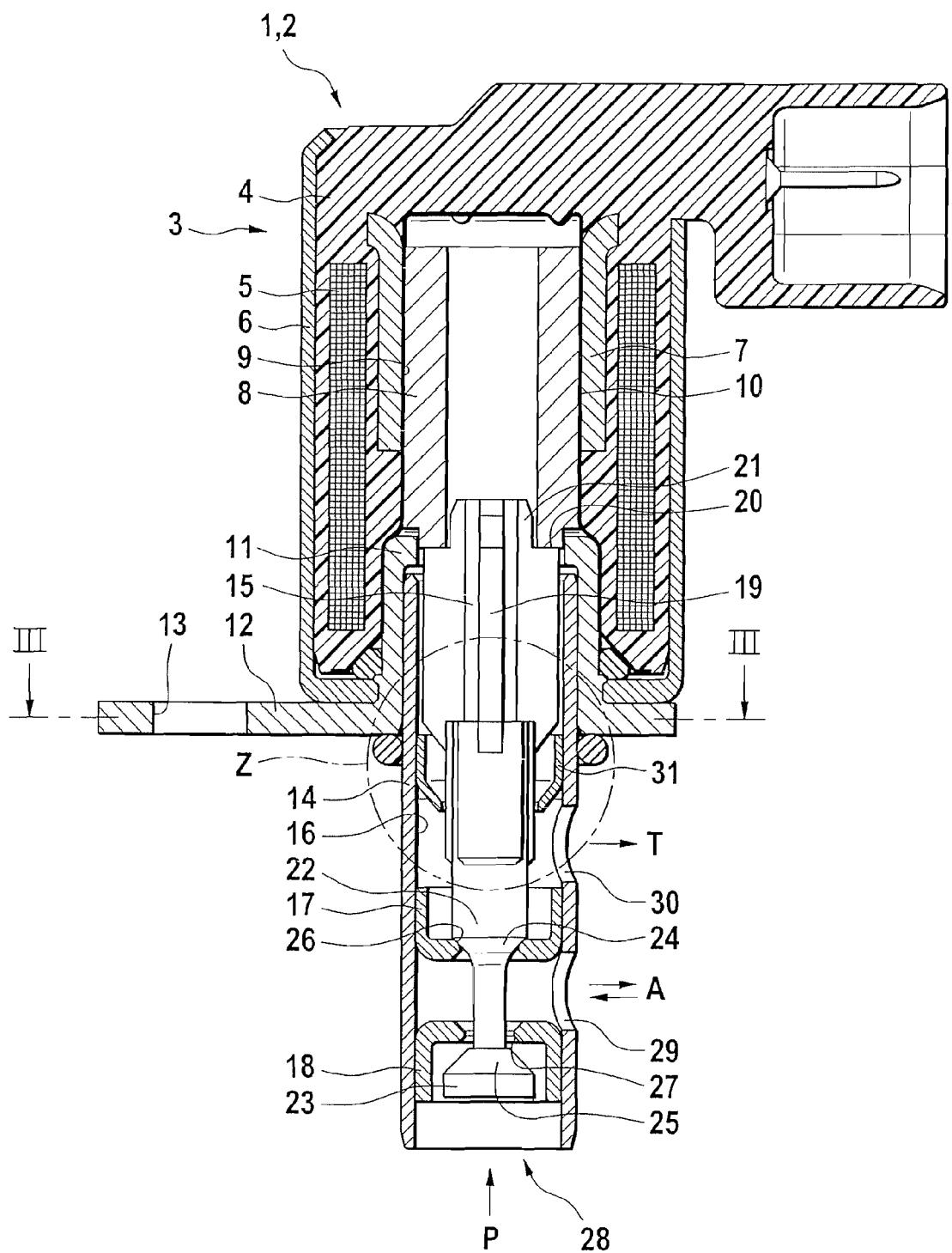
FIG. 1 a longitudinal section view through the 3/2 directional control valve.

From FIG. 1, an electromagnetic hydraulic valve 1 is provided, which is constructed as 3/2 directional control valve 2 and which can be used for controlling a variable valve train of a not-shown internal combustion engine. The hydraulic valve 1 is made from an electromagnet 3 with a coil winding 5 encased in a coil body 4 made from plastic in a magnet housing 6. As the upper magnet pole for a magnetic armature 8 there is a sleeve 7 that is encased in the coil body 4 and that surrounds a non-magnetic metal sleeve 10, which is used as an armature guide 9 and in which the magnetic armature 8 is guided so that it can move longitudinally. A lower magnet pole is formed by an annular collar 11, which transitions into a flange region 12 with a threaded opening 13 for attaching the hydraulic valve 1 to a suitable position of the internal combustion engine.

Furthermore, an upper section of a valve housing 14 facing the electromagnet 3 is held in the annular collar 11 of the lower magnet pole. The valve housing 14 has a tubular construction and is made from a magnetizable material, which is magnetized during the operation of the hydraulic valve 1 as a result of the electromagnetic effect of the energized electromagnet 3. The valve housing 14 houses a valve push rod 15 connecting to the magnetic armature 8 and also two cup-shaped sealing sleeves 17, 18 pressed into an inner casing surface 16 of the valve housing 14. The valve push rod 15 is produced as a molded body made from plastic and is guided so that it can move longitudinally in the inner casing surface 16 of the valve housing 14, as can be seen clearly in FIG. 3, with three rails 19 offset by 120° relative to each other. Furthermore, the valve push rod 15 is in loose active connection with the magnetic armature 8 through an end 20 contacting the magnetic armature 8 and through a centering pin 21 formed on the end 20 and projecting into the hollow cylindrical magnetic armature 8. Starting from the rails 19, the valve push rod 15 tapers and has two sealing bodies 22, 23 with conical and facing sealing surfaces 24, 25 on the side facing away from the magnetic armature 8. The sealing surfaces 24, 25 act alternately with valve seats 26, 27 together, which are formed on the sealing sleeves 17, 18.

The control of the hydraulic medium flow through the hydraulic valve 1 is provided in the manner described below. In FIG. 1, a first switch position of the hydraulic valve 1 is shown. In this first switch position, the coil winding 5 is located in the energized state, so that the magnetic armature 8 is attracted while carrying along the valve push rod 15 due to the magnetic force of attraction of the lower magnet pole and is displaced in this direction. In this position, the sealing surface 24 of the first sealing body 22 contacts the valve seat 26 of the sealing sleeve 17 facing the magnet armature 8. Simultaneously, the sealing surface 25 of the second sealing body 23 is at a distance from the valve seat 27 of the sealing sleeve 18 facing away from the magnetic armature 8. Thus, a hydraulic medium flow can be set between a pressure connection P, which is formed by an axial opening 28 of the tubular valve housing 14, and a work connection A, which is formed by an opening 29 arranged radially between the sealing sleeves 17, 18 in the valve housing 14. In this switch position of the hydraulic valve 1, an actuator communicating with the work connection A in the variable valve train is consequently provided with pressurized hydraulic medium, in order to traverse, for example, an adjustment path or an adjustment angle.

For the return movement of the actuator into its original position, the energization of the coil winding 5 is switched off. In this de-energized state of the electromagnet 3, no electromagnetic forces act on the magnetic armature 8, so that this is displaced in the direction of the second switch position of the hydraulic valve 1 together with the valve push rod 15 pressurized by backed-up pressure of the hydraulic medium. This switch position is achieved when the sealing surface 25 of the second sealing body 23 is located in the valve seat 27, so that the hydraulic medium flow is interrupted between the pressure connection P and the work connection A. Simultaneously, because the sealing surface 24 of the first sealing body 22 is at a distance from the valve seat 26, a hydraulic medium flow is allowed between the work connection A and a tank connection T. The tank connection T is constructed like the work connection A as a radial opening 30 in the valve housing 14 and connects the hydraulic valve 1 to an unpressurized hydraulic medium reservoir of the internal combustion engine. Consequently, the hydraulic medium volume corresponding to the adjustment path or adjustment angle of the returning actuator can flow out via the tank connection T.

Figure 2:
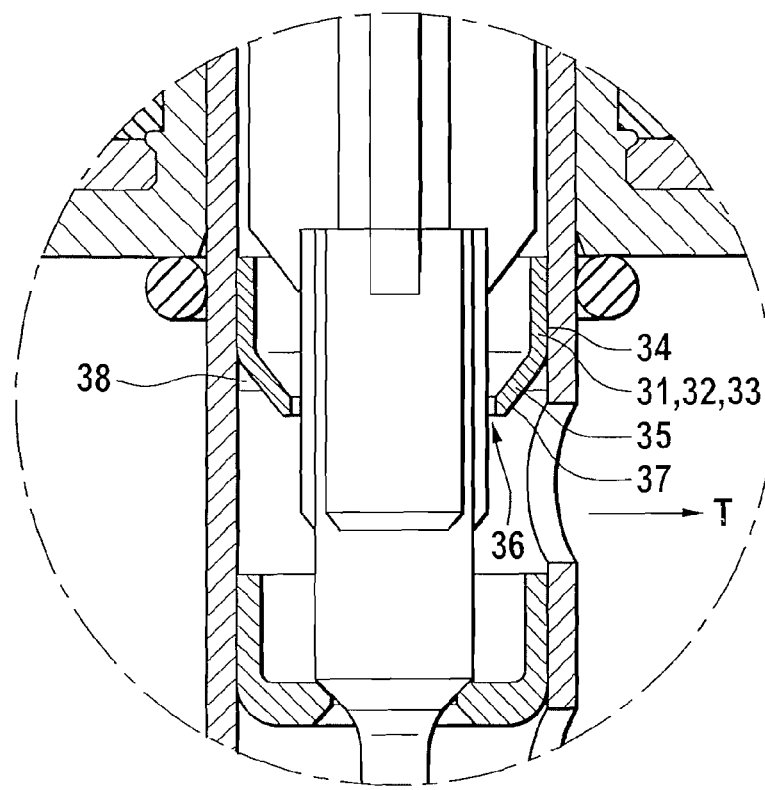
FIG. 2 the detail Z from FIG. 1.

Penetration of sediment particles into the sediment-sensitive guide gap between the armature guide 9 and the magnetic armature 8 is largely prevented, especially in the horizontally installed case of the hydraulic valve 1, by the shielding effect of an intermediate floor 31 arranged between the armature guide 9 and the connections P, A, T in the valve housing 14. The intermediate floor 31 is shown enlarged in the detail Z shown in FIG. 2 and is constructed in the embodiment as an individual part 32 in the form of a thin-walled and cup-shaped annular sleeve 33. This is pressed in a hydraulically sealing way into the inner casing surface 16 of the valve housing 14 with a cylindrical outer casing surface 34 between the rails 19 of the valve push rod 15 and the tank connection T. Furthermore, the annular sleeve 33 has a floor 35, which surrounds the valve push rod 15 with an opening 36 concentric to the outer casing surface 34 with play and consequently with no friction as well as without a guiding function. Therefore, because the floor 35 of the annular sleeve 33 has a conical construction and the open side of the annular sleeve 33 is turned toward the magnetic armature 8, an annular space 38 is formed between an outer side 37 of the floor 35 facing away from the magnetic armature 8 and the inner casing surface 16 of the valve housing 14. Due to the magnetizing valve housing 14 during the operation of the hydraulic valve 1, the predominantly ferromagnetic sediment particles are attracted by the valve housing 14 and can be deposited in the region of the annular space 38. In addition, the annular sleeve 33 is made from a non-magnetizable material, in order to counteract a deposit of sediment particles in the direct vicinity of the valve push rod 15 and thus a transport of deposited sediment particles in the direction of the magnetic armature 8.

As a suitable material for the annular sleeve 33, an austenitic corrosion-resistant steel, for example, of the quality X5CrNi1810, is provided. Alternatively, the annular sleeve 33 can also be produced from plastic, wherein, in this case, the connection to the valve housing 14 would preferably also have positive-fit portions, such as, for example, a clip connection. Alternatively, the possibility should also be ruled out, nevertheless, for producing the annular sleeve 33 from a permanent magnetic material.

Figure 3:
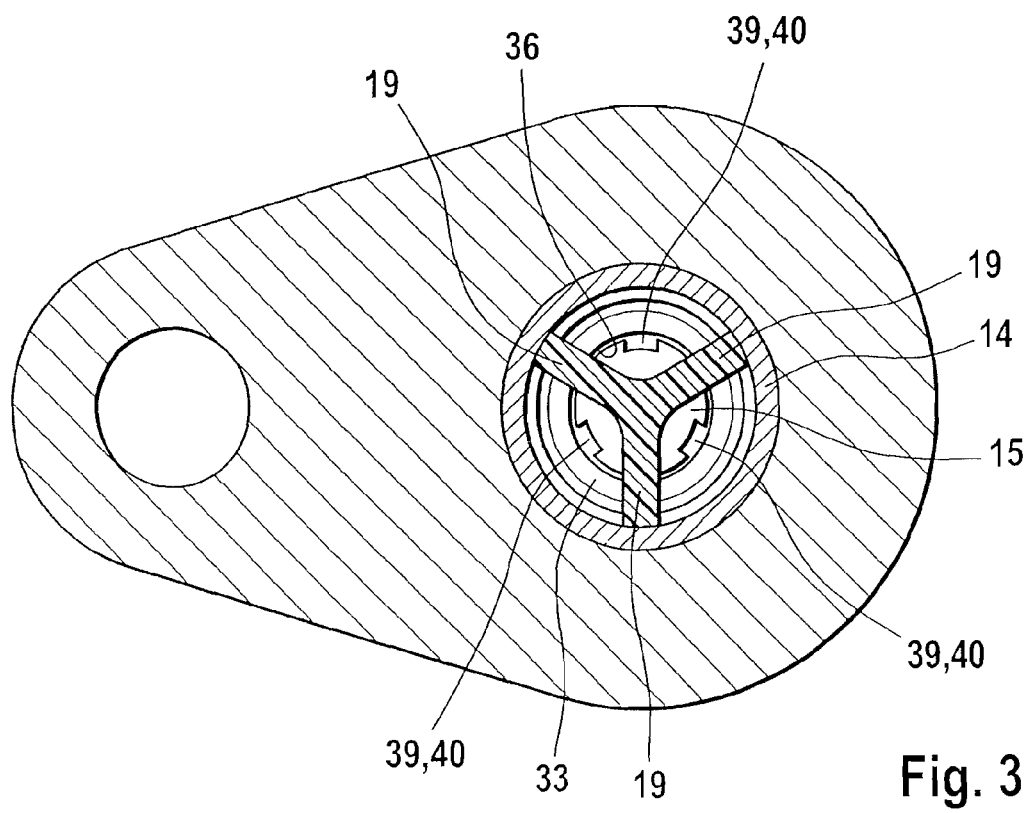
FIG. 3 the section view A-A according to FIG. 1.

As is visible from the section A-A shown in FIG. 3, three overflow cross sections 39 for hydraulic medium are located between the opening 36 of the annular sleeve 33 and the valve push rod 15 in the direction of the magnetic armature 8. These overflow cross sections 39 result from longitudinal grooves 40, which extend in the valve push rod 15 offset in angle to the rails 19. The overflow cross sections 39 are necessary, on one hand, for equalizing the pressure and volume of the hydraulic medium during the switching process of the magnetic armature 8 and the valve push rod 15 and provide, on the other hand, sufficient lubrication of the armature guide 9 with hydraulic medium. Although a transport of sediment particles into the region of the magnetic armature 8 and the armature guide 9 is not ruled out by these overflow cross sections 39, according to the invention it is guaranteed that the predominant part of the sediment particles is deposited in the region of the annular sleeve 33 and the magnetized valve housing 14 and remains there or is flushed out from the hydraulic valve 1 again. In this respect, the hydraulic valve 1 according to the invention is largely protected from temporary or permanent locking of the magnetic armature 8 in the armature guide 9 due to penetrating sediment particles with simple means that can be realized cost-effectively relative to the state of the art.

LIST OF REFERENCE SYMBOLS

1 Hydraulic valve
2 3/2 directional control valve
3 Electromagnet
4 Coil body
5 Coil winding
6 Magnet housing
7 Sleeve
8 Magnetic armature
9 Armature guide
10 Metal sleeve
11 Annular collar
12 Flange region
13 Threaded opening
14 Valve housing
15 Valve push rod
16 Inner casing surface
17 Sealing sleeve
18 Sealing sleeve
19 Rail
20 End face
21 Centering pin
22 Sealing body 23 Sealing body
24 Sealing surface
25 Sealing surface
26 Valve seat
27 Valve seat
28 Axial opening
29 Opening
30 Opening
31 Intermediate floor
32 Individual part
33 Annular sleeve
34 Outer casing surface
35 Floor
36 Opening
37 Outer side
38 Annular space
39 Overflow cross section
40 Longitudinal grooves
W Pressure connection
A Work connection
T Tank connection

The invention claimed is:

1. Electromagnetic hydraulic valve comprising a magnetic armature which is guided so that the magnetic armature can move longitudinally in an armature guide and which actuates a valve push rod extending in a valve housing, the valve push rod controls a connection between connection openings constructed in the valve housing for hydraulic medium by placing the valve push rod in active connection with one or more sealing bodies, which correspond to one or more sealing sleeves supported in the valve housing, the hydraulic valve has a sediment particle separator comprised of an intermediate floor, which is arranged between the armature guide and the connection openings and which forms a hydraulically tight seal with an inner casing surface of the valve housing, and the valve housing is comprised of a magnetizable material for separating ferromagnetic sediment particles.

2. Hydraulic valve according to claim 1, wherein the intermediate floor is produced as an individual part, is made from a non-magnetizable material, and is connected to the valve housing.

3. Hydraulic valve according to claim 2, wherein the individual part is produced from austenitic, corrosion-resistant steel.

4. Hydraulic valve according to claim 2, wherein the individual part is constructed as a thin-walled and cup-shaped annular sleeve with a cylindrical outer casing surface and a floor, which surrounds the valve push rod with an opening concentric to the outer casing surface, and is pressed via the outer casing surface into the inner casing surface of the valve housing, so that the open side of the annular sleeve is turned toward the magnetic armature.

5. Hydraulic valve according to claim 4, wherein the floor of the annular sleeve has a conical construction, so that an annular space for deposited sediment particles is formed between an outer side of the floor facing away from the magnetic armature and the inner casing surface of the valve housing.

6. Hydraulic valve according to claim 1, wherein the hydraulic valve is constructed as a 3/2 directional control valve, the connection openings are used as a pressure connection, work connection, and tank connection.

7. Hydraulic valve according to claim 1, wherein the valve push rod is produced as a molded body made from plastic and has projecting rails, with which the valve push rod is guided in the valve housing on a side of the intermediate floor facing the magnetic armature, while the sealing bodies of the valve push rod are provided on the side of the intermediate floor facing away from the magnetic armature and have facing sealing surfaces, which interact alternately with valve seats that are formed on the sealing sleeves pressed into the valve housing, the sealing sleeves being cup-shaped.

8. Hydraulic valve according to claim 1, wherein at least one overflow cross section in a direction of the magnetic armature remains between the valve push rod and the intermediate floor.

9. Hydraulic valve according to claim 1, wherein the hydraulic valve comprises a control for hydraulically displaceable actuators of a variable valve train of an internal combustion engine.

10. Hydraulic valve according to claim 1, further comprising
   between the valve push rod and the intermediate floor there remains at least one overflow cross section in a direction of the magnetic armature;
   the intermediate floor is produced from austenitic, corrosion-resistant steel and is constructed as a thin-walled and cup-shaped annular sleeve with a cylindrical outer casing surface and a floor, which surrounds the valve push rod with an opening concentric to the outer casing surface, and is pressed via the outer casing surface into the inner casing surface of the valve housing, so that an open side of the annular sleeve is facing the magnetic armature;
   the valve push rod is produced as a molded body made from plastic and has projecting rails, with which the valve push rod is guided in the valve housing on the side of the annular sleeve facing the magnetic armature, while the sealing bodies of the valve push rod are located on a side of the intermediate floor facing away from the magnetic armature and have conical sealing surfaces, which interact alternately with valve seats that are formed on the cup-shaped sealing sleeves pressed into the valve housing; and
   the hydraulic valve is constructed as a 3/2 directional control valve for controlling hydraulically displaceable actuators of a variable valve train of an internal combustion engine, and the connection openings are used as a pressure connection, work connection, and tank connection.

* * * * *